(12) United States Patent
Takeda et al.

(10) Patent No.: US 12,252,114 B2
(45) Date of Patent: Mar. 18, 2025

(54) PARKING ASSISTANCE METHOD AND PARKING ASSISTANCE DEVICE

(71) Applicant: Nissan Motor Co., Ltd., Yokohama (JP)

(72) Inventors: Muku Takeda, Kanagawa (JP); Yasuhiro Suzuki, Kanagawa (JP); Takeshi Watanabe, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/713,065

(22) PCT Filed: Nov. 30, 2021

(86) PCT No.: PCT/JP2021/043810
§ 371 (c)(1),
(2) Date: May 23, 2024

(87) PCT Pub. No.: WO2023/100229
PCT Pub. Date: Jun. 8, 2023

(65) Prior Publication Data
US 2025/0026335 A1 Jan. 23, 2025

(51) Int. Cl.
*B60W 30/06* (2006.01)
*G01C 21/36* (2006.01)

(52) U.S. Cl.
CPC ......... *B60W 30/06* (2013.01); *G01C 21/3667* (2013.01)

(58) Field of Classification Search
CPC ........... B60W 30/06; B60W 2420/403; B60W 2554/20; G01C 21/3667; G08G 1/168;
(Continued)

(56) References Cited

U.S. PATENT DOCUMENTS 9,830,826 B2  11/2017  Suzuki et al.
10,086,809 B1 10/2018  Prasad
(Continued)

FOREIGN PATENT DOCUMENTS

CN    108791246 A    11/2018
CN    112528711 A     3/2021
(Continued)

OTHER PUBLICATIONS

Rafael Padilla, Wesley L. Passos, Thadeu L. B. Dias, Sergio L. Netto, and Eduardo A. B. da Silva. A Comparative Analysis of Object Detection Metrics with a Companion Open-Source Toolkit. Jan. 25, 2021. Electronics 2021, 10(3), 279; https://doi.org/10.3390/electronics10030279 (Year: 2021).*

*Primary Examiner* — Harry Y Oh
*Assistant Examiner* — Danielle M Jackson
(74) *Attorney, Agent, or Firm* — Young Basile Hanlon & MacFarlane, P.C.

(57) ABSTRACT

A parking assistance method includes: storing positions of target objects detected around the target parking position as learned target object positions; when the own vehicle travels in a vicinity of the target parking position after the learned target object positions are stored, counting the number of times that the learned target object position coincides with a surrounding target object position of a target object detected around the own vehicle and providing a higher degree of reliability to the learned target object position having a larger number of times of coincidence with the surrounding target object position; by comparing the learned target object position having a degree of reliability greater than or equal to a predetermined threshold degree of reliability with a position of a target object detected around the own vehicle, calculating a relative position of the own vehicle with respect to the target parking position.

10 Claims, 4 Drawing Sheets

(58) Field of Classification Search
CPC .. G08G 1/14; G08G 1/09; G08G 1/16; G08G 1/165; G08G 1/166; B62D 15/0285; B62D 15/027; G05D 1/0088
See application file for complete search history.

(56) References Cited

U.S. PATENT DOCUMENTS

| | | | |
|---|---|---|---|
| 10,953,869 B2 | 3/2021 | Iio et al. | |
| 11,273,821 B2 | 3/2022 | Yamaguchi et al. | |
| 11,417,114 B2 | 8/2022 | Zhang et al. | |
| 11,628,832 B2 | 4/2023 | Suzuki | |
| 2006/0167633 A1* | 7/2006 | Satonaka | G08G 1/168 701/300 |
| 2016/0116586 A1* | 4/2016 | Fukuman | G08G 1/166 367/99 |
| 2016/0371983 A1* | 12/2016 | Ronning | B62D 15/027 |
| 2017/0076608 A1* | 3/2017 | Suzuki | G08G 1/168 |
| 2019/0039605 A1 | 2/2019 | Iio et al. | |
| 2020/0017099 A1 | 1/2020 | Yamaguchi et al. | |
| 2020/0410229 A1* | 12/2020 | Ono | G06V 30/153 |
| 2021/0089793 A1 | 3/2021 | Zhang et al. | |
| 2021/0094536 A1* | 4/2021 | Suzuki | G05D 1/0212 |

FOREIGN PATENT DOCUMENTS

| | | |
|---|---|---|
| JP | 2015-231818 A | 12/2015 |
| JP | 2017-138664 A | 8/2017 |
| JP | 2019-014460 A | 1/2019 |
| JP | 2021-054267 A | 4/2021 |
| WO | 2018/070021 A1 | 4/2018 |

* cited by examiner

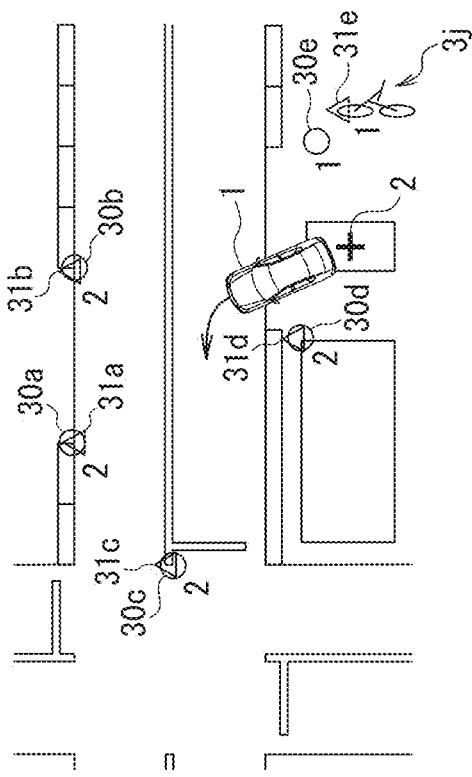
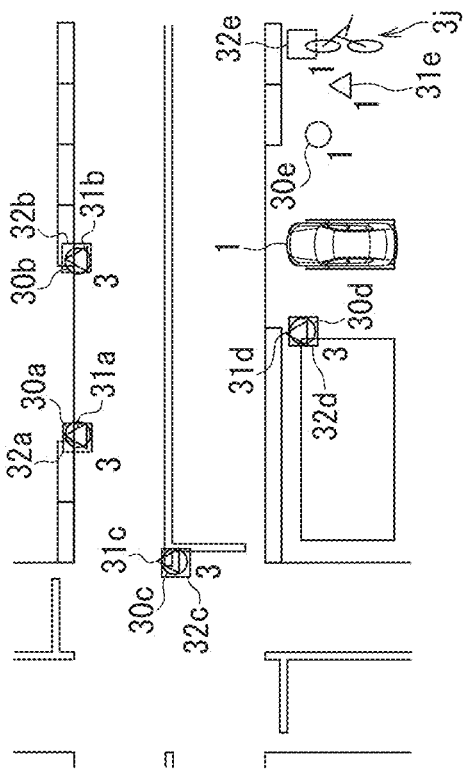
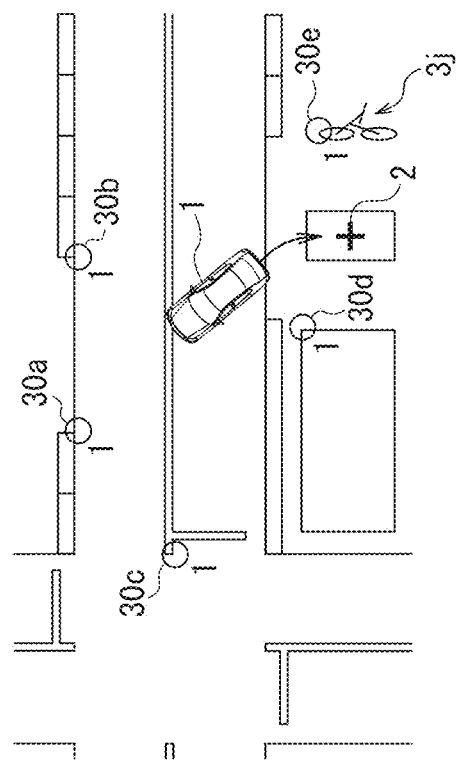
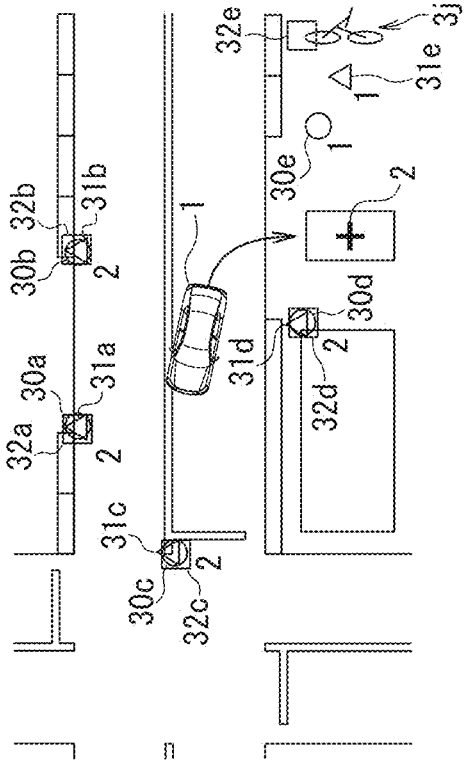

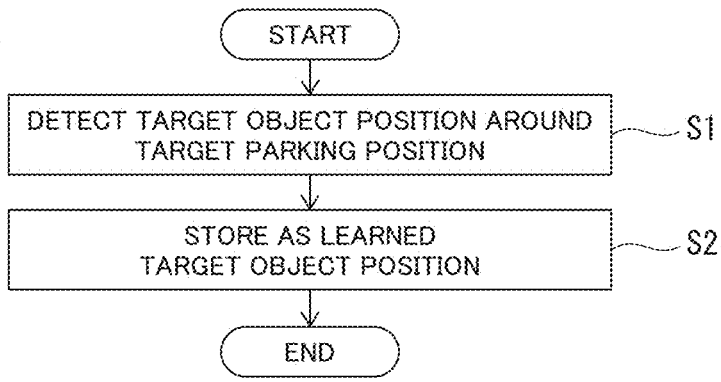
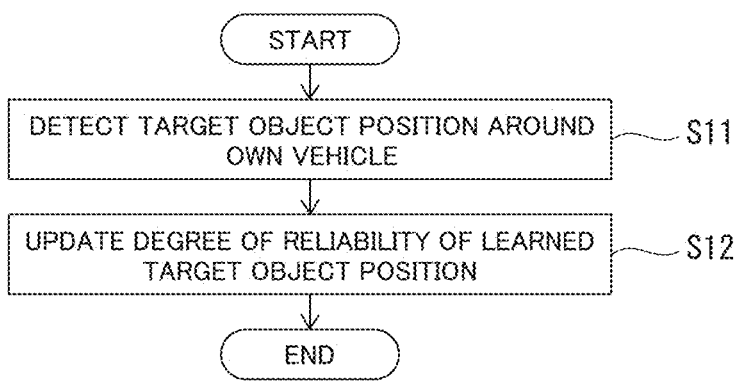
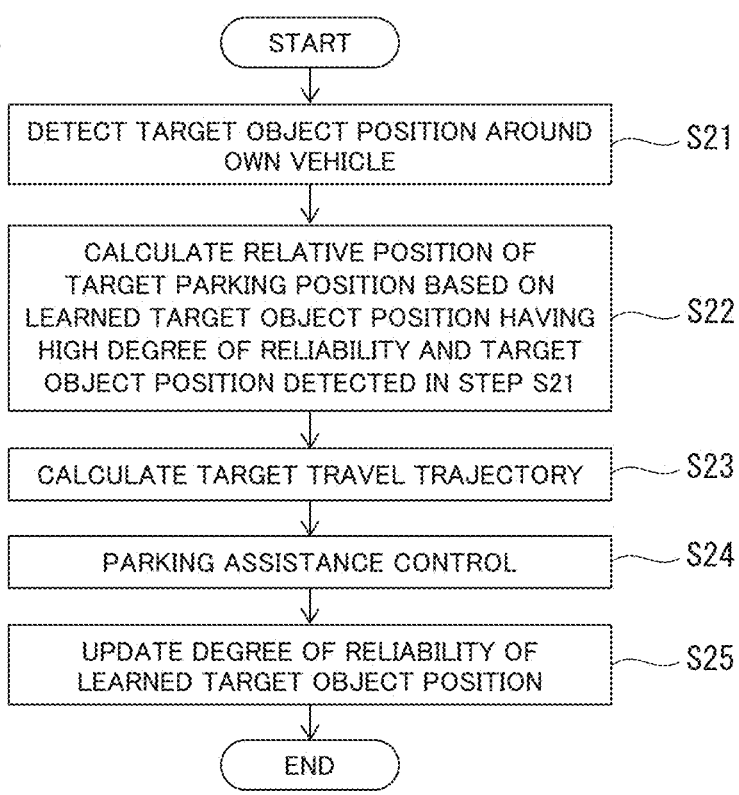

PARKING ASSISTANCE METHOD AND PARKING ASSISTANCE DEVICE

TECHNICAL FIELD

The present invention relates to a parking assistance method and a parking assistance device.

BACKGROUND

As a technology relating to parking assistance to assist parking of an own vehicle at a target parking position, JP 2017-138664 A described below has been known. In JP 2017-138664 A, a target object around the target parking position is detected and stored, a relative position of the own vehicle with respect to the target parking position is calculated, based on a position of a target object detected around the own vehicle at the time of autonomous parking and a position of the stored target object, and the own vehicle is caused to autonomously move to the target parking position, based on the relative position.

SUMMARY

However, when the stored target object is a movable object, there is a risk that the position of the target object changing after the target object is stored causes calculation precision of a relative position of the own vehicle with respect to the target parking position to deteriorate.

An object of the present invention is to, in parking assistance in which a relative position of an own vehicle with respect to a target parking position is calculated based on a pre-stored position of a target object around the target parking position, prevent calculation precision of a relative position from deteriorating due to the stored target object position changing.

According to an aspect of the present invention, there is provided a parking assistance method including: storing positions of a plurality of target objects detected around a target parking position when an own vehicle is parked at the target parking position as learned target object positions; when the own vehicle travels in a vicinity of the target parking position after the learned target object positions are stored, counting, with respect to each of the learned target object positions, a number of times that the learned target object position coincides with a surrounding target object position, the surrounding target object position being a position of a target object detected around the own vehicle; providing a higher degree of reliability to the learned target object position having a large number of times of coincidence with the surrounding target object position than to the learned target object position having a small number of times of coincidence with the surrounding target object position; by comparing the learned target object position having a degree of reliability greater than or equal to a predetermined threshold degree of reliability among the learned target object positions with a position of a target object detected around the own vehicle, calculating a relative position of an own vehicle with respect to the target parking position; based on the calculated relative position, calculating a target travel trajectory from a current position of the own vehicle to the target parking position; and performing parking assistance control to assist movement of the own vehicle along the calculated target travel trajectory.

According to an aspect of the present invention, it is possible to, in parking assistance in which a relative position of an own vehicle with respect to a target parking position is calculated based on a pre-stored position of a target object around the target parking position, prevent calculation precision of a relative position from deteriorating due to the stored target object position changing.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF THE DRAWINGS

FIGS. 4A to 4D are explanatory diagrams of an example of a provision method of degrees of reliability;

FIG. 6 is a flowchart of an example of processing in which a target object position is stored;

FIG. 7 is a flowchart of an example of processing in which a degree of reliability is updated; and FIG. 8 is a flowchart of an example of parking assistance control of an embodiment.

DETAILED DESCRIPTION (Configuration)

Figure 1:
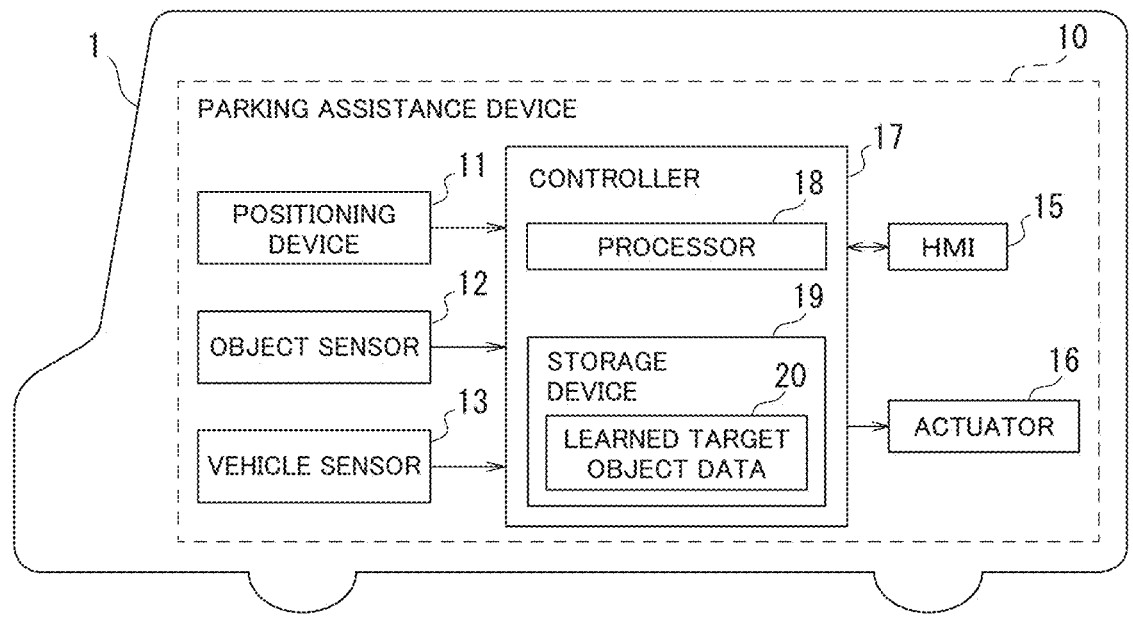
FIG. 1 is a diagram illustrative of an example of a schematic configuration of a parking assistance device.

FIG. 1 is a diagram illustrative of an example of a schematic configuration of a parking assistance device of an embodiment. An own vehicle 1 includes a parking assistance device 10 configured to assist parking of the own vehicle 1 at a target parking position. The parking assistance device 10 calculates a target travel trajectory from a current position of the own vehicle 1 to the target parking position and assists the own vehicle in traveling along the target travel trajectory.

In parking assistance performed by the parking assistance device 10, various forms of assisting the own vehicle 1 in traveling along the target travel trajectory are included. For example, the parking assistance device 10 may, by performing autonomous driving to control the own vehicle to travel to the target parking position along the target travel trajectory of the own vehicle 1, assist parking of the own vehicle 1. Note that the autonomous driving to control the own vehicle 1 to travel to the target parking position along the target travel trajectory of the own vehicle 1 means control to control all or some of a steering angle, a driving force, and a braking force of the own vehicle, autonomously perform all or a portion of travel along the target travel trajectory of the own vehicle 1, and thereby assist parking operation of a passenger.

In addition, for example, the parking assistance device 10 may, by displaying the target travel trajectory and the current position of the own vehicle 1 on a display device that the passenger of the own vehicle 1 can visually recognize, assist parking of the own vehicle 1.

The parking assistance device 10 includes a positioning device 11, an object sensor 12, vehicle sensors 13, human-machine interfaces (HMIs) 15, actuators 16, and a controller 17.

The positioning device 11 measures a current position of the own vehicle 1. The positioning device 11 may include, for example, a global navigation satellite system (GNSS) receiver. The GNSS receiver may be, for example, a global positioning system (GPS) receiver or the like.

The object sensor 12 detects an object in a predetermined distance range from the own vehicle 1 (for example, a detection range of the object sensor 12). The object sensor 12 detects a surrounding environment around the own vehicle 1, such as a relative position between an object existing in surroundings around the own vehicle 1 and the own vehicle 1, distance between the own vehicle 1 and the object, and a direction in which the object exists. The object sensor 12 may include, for example, a camera to capture the surrounding environment around the own vehicle 1. The camera may be, for example, cameras that capture images of the surroundings around the own vehicle 1 and generate captured images to be converted to a bird's eye view (around view monitoring image). The object sensor 12 may include a ranging device, such as a laser range finder (LRF), a radar, a light detection and ranging (LiDAR), or a laser radar.

The vehicle sensors 13 detect various information (vehicle information) that can be acquired from the own vehicle 1. The vehicle sensors 13 include, for example, a vehicle speed sensor configured to detect traveling speed (vehicle speed) of the own vehicle 1, wheel speed sensors configured to detect rotational speed of respective tires that the own vehicle 1 has, a triaxial acceleration sensor configured to detect acceleration (including deceleration) in three axial directions of the own vehicle 1, a steering angle sensor configured to detect a steering angle of a steering wheel, a turning angle sensor configured to detect a turning angle of steered wheels, a gyro sensor configured to detect angular velocity generated in the own vehicle 1, and a yaw rate sensor configured to detect a yaw rate.

The human-machine interfaces 15 are interface devices that give and receive information between the parking assistance device 10 and the passenger. The human-machine interfaces 15 include a display device (such as a display screen of a navigation system and a display device installed close to a meter in front of a driver seat) that the passenger of the own vehicle 1 can visually recognize. The human-machine interfaces 15 also include an operation element configured to accept an operation input by the passenger to the parking assistance device 10. For example, the operation element may be a button, a switch, a lever, a dial, a keyboard, a touch panel, or the like.

The actuators 16 include a steering actuator, an accelerator actuator, and a brake control actuator. The steering actuator controls a steering angle of a steering mechanism of the own vehicle 1 in accordance with a control signal from the controller 17. The accelerator actuator controls accelerator opening of a drive device, which is an engine or a drive motor, in accordance with a control signal from the controller 17. The brake actuator causes a braking device to operate in accordance with a control signal from the controller 17.

The controller 17 is an electronic control unit that performs parking assistance control of the own vehicle 1. The controller 17 includes a processor 18 and peripheral components, such as a storage device 19. The processor 18 may be, for example, a CPU or an MPU.

The storage device 19 may include a semiconductor storage device, a magnetic storage device, an optical storage device, and the like. The storage device 19 may include registers, a cache memory, and a memory, such as a ROM or a RAM, that is used as a main storage device. Functions of the controller 17, which will be described below, may be achieved by, for example, the processor 18 executing computer programs stored in the storage device 19.

Note that the controller 17 may be formed using dedicated hardware for performing various types of information processing that will be described below. For example, the controller 17 may include a functional logic circuit that is implemented in a general-purpose semiconductor integrated circuit. For example, the controller 17 may include a programmable logic device, such as a field-programmable gate array, and the like.

Figure 2:
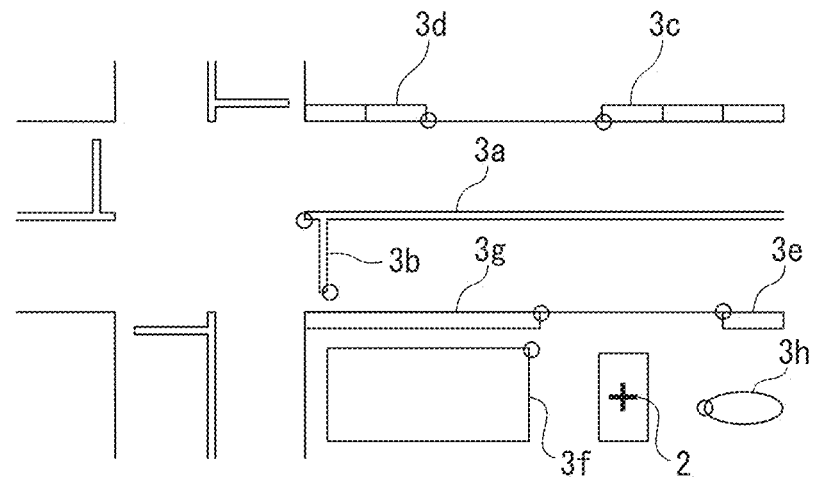
FIG. 2 is a schematic diagram of target object positions around a target parking position.

Next, an example of the parking assistance control performed by the parking assistance device 10 will be described. FIG. 2 is now referred to. When use of the parking assistance performed by the parking assistance device 10 is started, first, a relative positional relationship between a target object position of a target object existing around a target parking position 2 and the target parking position 2 is stored in the storage device 19. The target parking position 2 is a target position at which the own vehicle 1 is to be parked. The target object is a ground object serving as a mark for specifying the current position of the own vehicle 1. The target object may be, for example, a pavement marking (a lane boundary line 3a, a stop line 3b, a road sign, or the like), a road boundary (curbs 3c to 3e, a guardrail, or the like), or an obstacle (a house 3f, a wall 3g, an objet 3h, or the like).

When a relative positional relationship between a target object position and the target parking position 2 is stored in the storage device 19, an operation mode of the parking assistance device 10 is set to a "target object learning mode". Subsequently, the own vehicle 1 is parked at the target parking position 2 by manual driving. Note that when the own vehicle 1 is to be parked at the target parking position 2 by manual driving, the parking assistance device 10 may automatically set the operation mode to the "target object learning mode". When the own vehicle 1 is to be parked at the target parking position 2 by manual driving, a driver may select whether or not the operation mode of the parking assistance device 10 is set to the "target object learning mode".

While the own vehicle 1 is moved to be parked at the target parking position 2 by manual driving, a target object position of a target object around the own vehicle 1 is detected by the object sensor 12. The object sensor 12 is a sensor to detect a target object position existing in a detection region within a predetermined detection distance range from the object sensor 12.

For example, the parking assistance device 10 may detect edges or corner portions of pavement markings (in the example in FIG. 2, the lane boundary line 3a and the stop line 3b), road boundaries (in the example in FIG. 2, ground contacting portions of the curbs 3c to 3e), and obstacles (in the example of FIG. 2, ground contacting portions of the house 3f, the wall 3g, and the objet 3h) in a captured image obtained by image capturing using the camera of the object sensor 12, as feature points and define positions of the feature points as target object positions.

The parking assistance device 10 calculates a feature amount of a detected feature point (for example, a shade, an attribute, or the like of the feature point). For detection of a feature point and calculation of a feature amount, various methods, such as SIFT, SURF, ORB, BRIAK, KAZE, and AKAZE, can be made use of. Note that the parking assistance device 10 may detect a feature point of point group information acquired by the laser range finder, the radar, or the LiDAR. Herein, an example in which a feature point is detected from a captured image will be described. Note that the detection of a feature amount of a feature point is not essential and it is only required to detect at least the position of a feature point.

The parking assistance device 10 calculates a relative positional relationship between a target object position (the position of a feature point) detected by the object sensor 12 and the target parking position 2. For example, the parking assistance device 10 calculates, based on a position of a feature point in an image and camera information relating to an attachment state (an attachment position, an optical axis angle, and an angle of view) of the camera to the own vehicle 1, a relative position of the feature point with respect to the own vehicle 1. Next, the parking assistance device 10 estimates a current position of the own vehicle 1 in a fixed coordinate system at a time point at which a target object position is detected by the object sensor 12 and calculates, based on the estimated current position and the relative position of the target object with respect to the own vehicle 1, a target object position in the fixed coordinate system. As used herein, the fixed coordinate system is a coordinate system with the origin set at a specific point (for example, a map coordinate system).

The current position of the own vehicle 1 in the fixed coordinate system may be estimated by, for example, the positioning device 11, odometry, or dead reckoning. The current position of the own vehicle 1 in the fixed coordinate system may be estimated by map mapping between a target object position detected by the object sensor 12 and a known target object position or high-definition map information.

Next, the parking assistance device 10 identifies the target parking position 2 in the fixed coordinate system. For example, the parking assistance device 10 may detect a position of the own vehicle 1 when the own vehicle 1 is positioned at the target parking position 2, as the target parking position 2. The target object position and the position of the target parking position 2 being determined in the fixed coordinate system causes a relative positional relationship between the target object position and the target parking position 2 to be determined.

The parking assistance device 10 stores a relative positional relationship between a target object position and the target parking position 2 in the storage device 19. For example, the parking assistance device 10 may individually store a target object position and the position of the target parking position 2 in the fixed coordinate system in the storage device 19. Alternatively, the parking assistance device 10 may calculate a target object position in a relative coordinate system with the origin set at the target parking position 2 and store the calculated target object position in the storage device 19. Herein, an example in which the parking assistance device 10 stores a target object position and the position of the target parking position 2 in the fixed coordinate system in the storage device 19 will be described.

Note that in the following description, a target object stored in the storage device 19 is sometimes referred to as a "learned target object". In addition, a target object position of a learned target object is sometimes referred to as a "learned target object position". Circular marks in FIG. 2 represent learned target object positions stored in the storage device 19.

Figure 3:
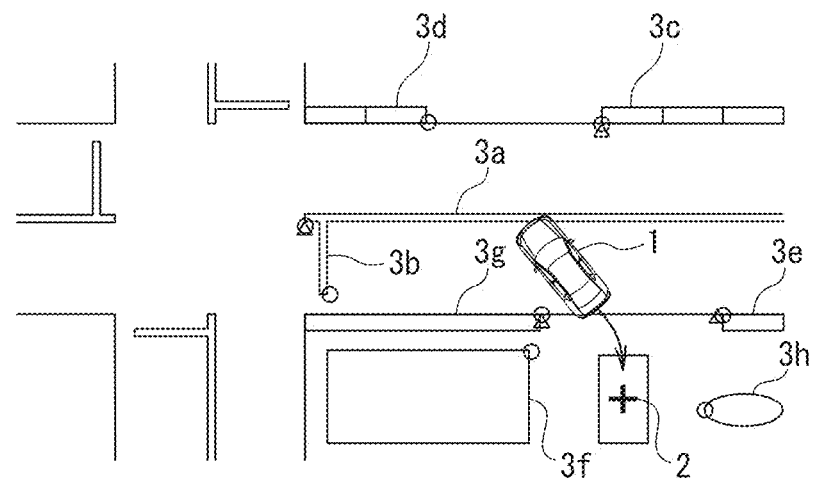
FIG. 3 is an explanatory diagram of an example of a parking assistance method.

Next, a parking assistance method performed by the parking assistance device 10 will be described with reference to FIG. 3. In order to use the parking assistance, the operation mode of the parking assistance device 10 is set to a "parking assistance mode". In the parking assistance mode, the parking assistance device 10 retrieves the target object positions of learned target objects and the position of the target parking position 2 stored in the storage device 19. Circular marks in FIG. 3 represent the target object positions of learned target objects retrieved from the storage device 19 in the parking assistance mode.

The parking assistance device 10 detects a relative position with respect to the own vehicle 1 of a target object around the own vehicle 1 as a target object position of the target object around the own vehicle 1 by the object sensor 12. A detection method of a target object position is the same as the detection method in the target object learning mode. A target object position that the object sensor 12 detects in the parking assistance mode is indicated by a triangular mark. In the example in FIG. 3, corner portions of the lane boundary line 3a, the curbs 3c and 3e, and the wall 3g are detected as target object positions.

The parking assistance device 10 associates the same target object positions with each other by matching the respective target object positions detected by the object sensor 12 in the parking assistance mode (triangular marks) with the learned target object positions retrieved from the storage device 19 (circular marks). For example, the parking assistance device 10 may determine target object positions having the same or similar feature amounts to be the same target object positions. Alternatively, regardless of feature amounts, the parking assistance device 10 may associate the target object positions detected by the object sensor 12 (triangular marks) with the target object position of the learned target objects retrieved from the storage device 19 (circular marks) by matching relative positional relationships between the target object positions detected by the object sensor 12 (triangular marks) with relative positional relationships between the target object positions of the learned target objects retrieved from the storage device 19 (circular marks). Still alternatively, the parking assistance device 10 may associate the target object positions detected by the object sensor 12 (triangular marks) with the target object positions of the learned target objects retrieved from the storage device 19 (circular marks), using both the above-described feature amounts of feature points and relative positional relationships. In the example in FIG. 3, corner portions of each of the lane boundary line 3a, the curbs 3c and 3e, and the wall 3g are associated with each other.

The parking assistance device 10 calculates, based on relative positional relationships between the target object positions detected in the parking assistance mode (triangular marks) and the own vehicle 1 and relative positional relationships between learned target object positions (circular marks) associated with the detected target objects (triangular marks) and the target parking position 2, a relative position of the current position of the own vehicle 1 with respect to the target parking position 2.

For example, the parking assistance device 10 may calculate the position of the target parking position 2 in a relative coordinate system with reference to the current position of the own vehicle 1 (hereinafter, referred to as a "vehicle coordinate system"). Alternatively, the parking assistance device 10 may calculate, based on the relative positional relationships between the respective target object positions detected in the parking assistance mode (triangular marks) and the own vehicle 1 and the learned target object positions in the fixed coordinate system (circular marks), the current position of the own vehicle 1 in the fixed coordinate system. The position of the own vehicle 1 and the position of the target parking position 2 in the fixed coordinate system being determined causes the relative position of the current position of the own vehicle 1 with respect to the target parking position 2 to be determined.

The parking assistance device 10 calculates, based on the relative position of the current position of the own vehicle 1 with respect to the target parking position 2, a target travel trajectory starting from the current position of the own vehicle 1 and reaching the target parking position 2. The parking assistance device 10 performs parking assistance control to assist movement of the own vehicle 1 along the calculated target travel trajectory. For example, the parking assistance device 10 performs autonomous driving to control the own vehicle to travel to the target parking position along the calculated target travel trajectory. In addition, for example, the parking assistance device 10 displays the target travel trajectory and the current position of the own vehicle 1 on the display device that a user of the own vehicle 1 can visually recognize.

However, when a learned target object position is a target object position of a movable object (such as a bicycle placed around the target parking position 2 and a potted plant grown in a plant pot), the object is sometimes moved after the learned target object position is stored. In this case, since a target object position detected at the time of parking assistance is caused to be displaced from a learned target object position stored in the storage device 19 or a target object itself disappearing causes the target object position not to be detected at the time of parking assistance, there is a risk that calculating a relative position of the current position of the own vehicle 1 with respect to the target parking position 2, based on learned target object positions including such target object positions causes calculation precision of the relative position to deteriorate.

Thus, the parking assistance device 10 of the embodiment detects the target object position of a target object around the own vehicle 1 on an occasion when the own vehicle 1 travels in a vicinity of the target parking position 2 after the learned target object positions are stored. A target object position that is detected on the occasion when the own vehicle 1 travels in the vicinity of the target parking position 2 after the learned target object positions are stored is sometimes referred to as a "surrounding target object position" in the following description.

The parking assistance device 10 counts, with respect to each of the learned target object positions stored in the storage device 19, the number of times that the learned target object position coincides with a surrounding target object position on every occasion when the own vehicle 1 travels in the vicinity of the target parking position 2 after the learned target object positions are stored. Alternatively, the parking assistance device 10 may count after the learned target object positions are stored, with respect to each of the learned target object positions stored in the storage device 19, the number of times that the learned target object position coincides with a surrounding target object position every time the number of occasions when the own vehicle 1 travels in the vicinity of the target parking position 2 reaches a predetermined number (for example, once every two times or once every three times). Still alternatively, the parking assistance device 10 may count, with respect to each of the learned target object positions stored in the storage device 19, the number of times that the learned target object position coincides with a surrounding target object position on every occasion when the own vehicle 1 travels in the vicinity of the target parking position 2 after the learned target object positions are stored and every predetermined specific scene (for example, on every specific scene, such as a scene in which the own vehicle 1 leaves the target parking position 2 or a scene in which the own vehicle 1 enters the target parking position 2). That is, the parking assistance device 10 counts, with respect to each of the learned target object positions stored in the storage device 19, the number of times that the learned target object position coincides with a surrounding target object position at an arbitrary timing when the own vehicle 1 travels in the vicinity of the target parking position 2 after the learned target object positions are stored.

The parking assistance device 10 provides a higher degree of reliability to a learned target object position having a large number of times of coincidence with a surrounding target object position than to a learned target object position having a small number of times of coincidence with a surrounding target object position. The parking assistance device 10, by comparing a learned target object position having a degree of reliability greater than or equal to a predetermined threshold degree of reliability among the learned target object positions with the position of a target object detected around the own vehicle 1, calculates a relative position of the own vehicle 1 with respect to the target parking position 2.

Because of this configuration, when positions of a fixed object and a movable object are stored as learned target object positions and subsequently the movable object is moved before a time point at which the parking assistance control is performed, the parking assistance device 10 can provide a higher degree of reliability to the learned target object position of the fixed object (an immovable object or an immobile object) than to the learned target object position of the movable object. As a result, since among the learned target object positions, only the learned target object position of a fixed object can be selected and used for the calculation of the relative position of the own vehicle 1 with respect to the target parking position 2, it is possible to prevent calculation precision of the relative position from deteriorating.

With reference to FIGS. 4A to 4D, an example of a method for providing a degree of reliability to a learned target object position will be described. First, in the target object learning mode, the parking assistance device 10, when parking the own vehicle 1 at the target parking position 2, detects target object positions of a plurality of target objects around the own vehicle 1. The parking assistance device 10 stores the detected positions of the plurality of target objects in the storage device 19 as learned target object positions.

Circular marks 30a to 30e in FIG. 4A represent learned target object positions stored in the storage device 19. In the example in FIG. 4A, the circular marks 30a and 30b represent learned target object positions of curbs, the circular mark 30c represents a learned target object position of a lane boundary line, and the circular mark 30d represents a learned target object position of the house. On the other hand, the circular mark 30e represents a learned target object position of a movable object 3j (for example, a bicycle).

Each of the learned target object positions 30a to 30e is provided with a degree of reliability. Immediately after the learned target object positions 30a to 30e are stored, all the degrees of reliability of the learned target object positions 30a to 30e are the same value (initial value). Numerical values "1" on the lower left side of the learned target object positions 30a to 30e in FIG. 4A indicate the degrees of reliability of the learned target object positions 30a to 30c. The parking assistance device 10 stores the learned target object positions and the degrees of reliability in association with each other in the storage device 19 as learned target object data 20.

FIG. 4B is now referred to. The parking assistance device 10 detects the target object position of a target object around the own vehicle 1 (that is, detects a surrounding target object position) on the occasion when the own vehicle 1 travels in a vicinity of the target parking position 2 after the learned target object positions 30a to 30e are stored. Triangular marks 31a to 31e represent surrounding target object positions. The triangular marks 31a and 31b represent surrounding target object positions of the curbs, the triangular mark 31c represents a surrounding target object position of the lane boundary line, the triangular mark 31d represents a surrounding target object position of the house, and the triangular mark 31e represents a surrounding target object position of the movable object 3j.

An occasion of detecting the surrounding target object positions 31a to 31e may be any occasion as long as the occasion is an occasion when the own vehicle 1 travels in the vicinity of the target parking position 2 after the learned target object positions 30a to 30e are stored. In the example in FIG. 4B, the surrounding target object positions 31a to 31e are detected on the occasion when the own vehicle 1 leaves the target parking position 2.

The occasion when the own vehicle 1 leaves the target parking position 2 may be, for example, an occasion when the driver causes the own vehicle 1 to leave the target parking position 2 by manual driving. In addition, when the parking assistance device 10 has a function of parking space-leaving assistance control, the occasion of detecting the surrounding target object positions 31a to 31e may be a time when carrying out the parking space-leaving assistance control.

The parking space-leaving assistance control may be control to calculate a target travel trajectory to cause the own vehicle 1 to leave the target parking position 2 that is the current position of the parked own vehicle 1, based on the target object positions detected around the own vehicle 1 and the learned target object positions and cause the own vehicle 1 to move along the target travel trajectory.

In addition, for example, the occasion of detecting the surrounding target object positions 31a to 31e may be an occasion when the own vehicle 1 is to be parked at the target parking position 2 by the parking assistance control performed by the parking assistance device 10 after the learned target object positions 30a to 30e are stored.

The parking assistance device 10 counts the number of times that the learned target object positions 30a to 30e coincide with the surrounding target object positions 31a to 31e, with respect to each of the learned target object positions 30a to 30c on every occasion when the own vehicle 1 travels in the vicinity of the target parking position 2. For example, when the feature amounts of a learned target object position and a surrounding target object position are the same as or similar to each other, the parking assistance device 10 may determine that the target object positions coincide with each other. In the example in FIG. 4B, the learned target object positions 30a to 30d coincide with the surrounding target object position 31a to 31d, respectively. Thus, the parking assistance device 10 increases the numbers of times that the learned target object positions 30a to 30d coincide with surrounding target object positions by one. On the other hand, since the movable object 3j is moved after the learned target object position 30e is stored, the learned target object position 30e does not coincide with the surrounding target object position 31c. Thus, the parking assistance device 10 does not increase the number of times that the learned target object position 30e coincides with a surrounding target object position.

The parking assistance device 10 provides higher degrees of reliability to the learned target object positions 30a to 30d having large numbers of times of coincidence with surrounding target object positions than to the learned target object position 30e having a small number of times of coincidence with a surrounding target object position.

For example, the parking assistance device 10 may provide a degree of reliability according to the number of times that each of the learned target object positions 30a to 30e coincides with a surrounding target object position. Numerical values "2" on the lower left side of the learned target object positions 30a to 30d in FIG. 4B indicate the degrees of reliability of the learned target object positions 30a to 30d, and a numerical value "1" on the lower left side of the learned target object position 30c indicates the degree of reliability of the learned target object position 30c. As described above, each of the learned target object positions 30a to 30d is provided with a degree of reliability higher than the degree of reliability of the learned target object position 30c.

FIG. 4C is now referred to. The parking assistance device 10, when performing the parking assistance control after storing the learned target object positions 30a to 30c, detects the target object position of a target object around the own vehicle 1 (that is, a surrounding target object position). Square marks 32a to 32e represent surrounding target object positions that the parking assistance device 10 detects when performing the parking assistance control. The square marks 32a and 32b represent the surrounding target object positions of the curbs, the square mark 32c represents the surrounding target object position of the lane boundary line, the square mark 32d represents the surrounding target object position of the house, and the square mark 32e represents the surrounding target object position of the movable object 3j.

The parking assistance device 10 selects only a learned target object position having a degree of reliability greater than or equal to a predetermined threshold degree of reliability among the learned target object positions 30a to 30c. Herein, a case where the threshold degree of reliability is "2" is assumed for the purpose of description. Thus, only the learned target object positions 30a to 30d of the fixed objects are selected, and the learned target object position 30e of the movable object 3j is not selected.

The parking assistance device 10 calculates, based on the selected learned target object positions 30a to 30d and the surrounding target object positions 32a to 32d corresponding to the learned target object positions 30a to 30d, a relative position of the current position of the own vehicle 1 with respect to the target parking position 2.

Since as described above, the parking assistance device 10 is capable of selecting only the learned target object positions 30a to 30d obtained by detecting fixed objects and making use of the selected learned target object positions 30a to 30d for calculation of the relative position of the own vehicle 1 with respect to the target parking position 2, it is possible to prevent calculation precision of the relative position from deteriorating.

FIG. 4D is now referred to. The parking assistance device 10 counts the number of times that the learned target object positions 30a to 30e coincide with the surrounding target object positions 32a to 32c, with respect to each of the learned target object positions 30a to 30e after the calculation of the relative position of the current position of the own vehicle 1 with respect to the target parking position 2 is completed (for example, after the own vehicle 1 has moved to the target parking position 2 by the parking assistance control).

In the example in FIG. 4D, the learned target object positions 30a to 30d coincide with the surrounding target object position 32a to 32d, respectively. Thus, the parking assistance device 10 increase the numbers of times that the learned target object positions 30a to 30d coincide with surrounding target object positions by one. On the other hand, the movable object 3j is further moved after the surrounding target object position 31e is detected, and the learned target object position 30e does not coincide with the surrounding target object position 32e. Thus, the parking assistance device 10 does not increase the number of times that the learned target object position 30e coincides with a surrounding target object position.

The parking assistance device 10 updates the degrees of reliability according to the number of times that the learned target object positions 30a to 30e coincide with the surrounding target object positions 32a to 32c, respectively. As a result, the degrees of reliability of the learned target object positions 30a to 30d have increased to "3". On the other hand, the degree of reliability of the learned target object position 30e remains at "1".

Repeating detection of a surrounding target object position and update of a degree of reliability as described above enables a higher degree of reliability to be provided to the learned target object position of a fixed object than to the learned target object position of a movable object. Thus, since among the learned target object positions, only the learned target object position of a fixed object can be selected and used for the calculation of the relative position of the own vehicle 1 with respect to the target parking position 2, it is possible to prevent calculation precision of the relative position from deteriorating.

Note that the parking assistance device 10 may detect the surrounding target object positions 31a to 31e and provide the learned target object positions 30a to 30e with degrees of reliability on an occasion when the own vehicle 1 "first" travels in the vicinity of the target parking position 2 after the learned target object positions 30a to 30e are stored. For example, the parking assistance device 10 may provide the learned target object positions 30a to 30e with degrees of reliability when first causing the own vehicle 1 to leave the target parking position 2.

Because of this configuration, when the movable object 3j is moved during a period from when the learned target object positions 30a to 30e are stored until subsequently the own vehicle 1 first travels in the vicinity of the target parking position 2, a target travel trajectory can be calculated excluding the learned target object position of the movable object 3j from when the own vehicle 1 is first parked at the target parking position 2 after the learned target object positions are stored.

Figure 5:
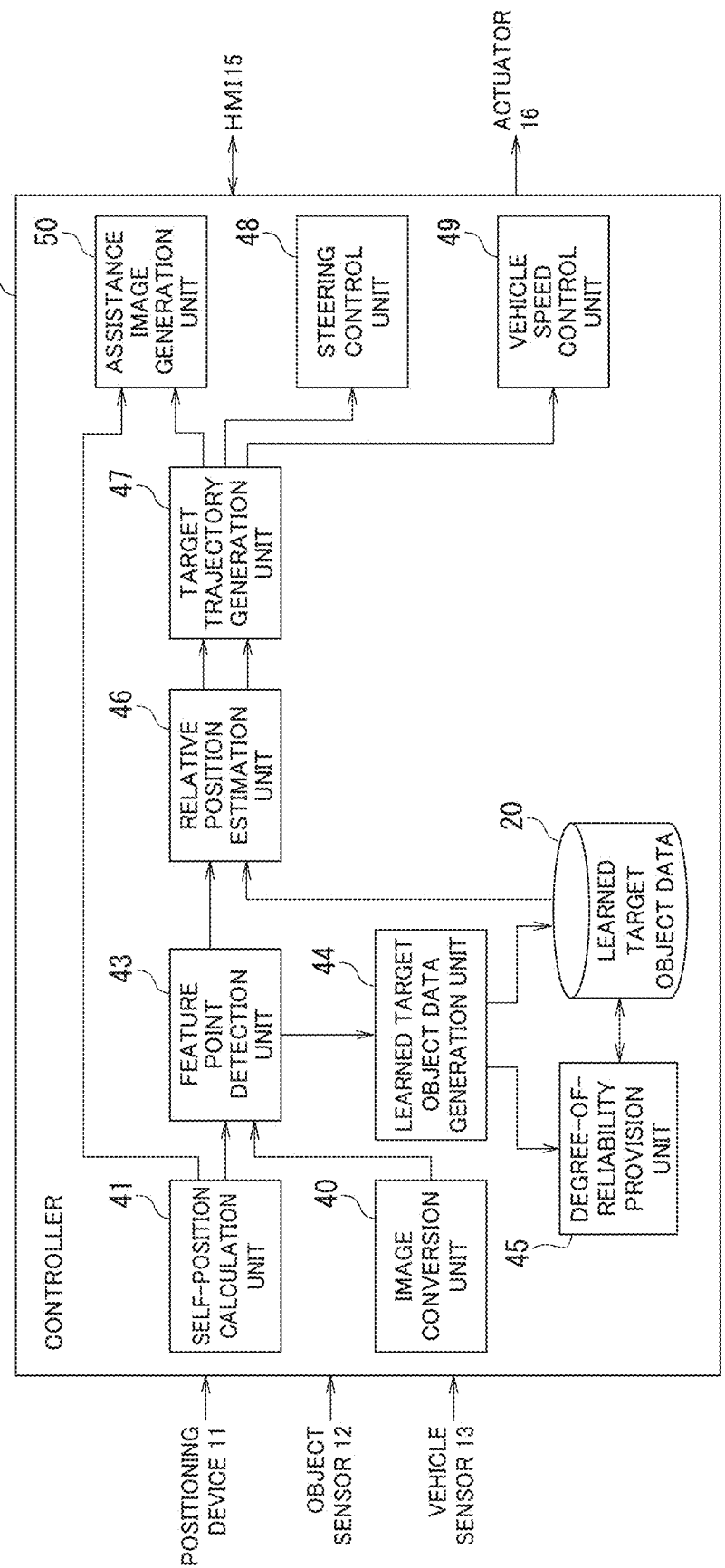
FIG. 5 is a block diagram of an example of a functional configuration of a controller in FIG. 1.

A functional configuration of the controller 17 will be described in more detail below. FIG. 5 is now referred to. The controller 17 functions as an image conversion unit 40, a self-position calculation unit 41, a feature point detection unit 43, a learned target object data generation unit 44, a degree-of-reliability provision unit 45, a relative position estimation unit 46, a target trajectory generation unit 47, a steering control unit 48, a vehicle speed control unit 49, and an assistance image generation unit 50.

The image conversion unit 40 converts captured images captured by the camera of the object sensor 12 to a bird's eye image (an around view monitoring image) that is an image viewed from a virtual viewpoint directly above the own vehicle 1 as illustrated in FIGS. 2 and 3. Hereinafter, a bird's eye image after conversion by the image conversion unit 40 is sometimes referred to as a "surrounding image".

The self-position calculation unit 41 calculates a current position of the own vehicle 1 in the fixed coordinate system by dead reckoning or the like based on vehicle information output from the vehicle sensors 13. The self-position calculation unit 41 may correct the calculated current position by map mapping or the like between a target object position detected by the object sensor 12 and a known target object position or the high-definition map information.

The feature point detection unit 43 detects a feature point of a target object around the own vehicle 1 from the surrounding image output from the image conversion unit 40 and calculates a feature amount of the feature point. The feature point detection unit 43 outputs the detected feature point and the feature amount of the feature point to the learned target object data generation unit 44 and the relative position estimation unit 46 in conjunction with the current position of the own vehicle 1 received from the self-position calculation unit 41.

The learned target object data generation unit 44 calculates a position of a feature point in the fixed coordinate system, based on a feature point output from the feature point detection unit 43 and the current position of the own vehicle 1.

In the target object learning mode, the learned target object data generation unit 44 stores the position of a feature point detected by the feature point detection unit 43 in the storage device 19 as a learned target object position. For example, the learned target object data generation unit 44 sets the degree of reliability of a learned target object position to an initial value and stores the learned target object position and the degree of reliability in association with each other in the storage device 19 as learned target object data 20.

On the other hand, when the operating mode of the parking assistance device 10 is not the target object learning mode, the learned target object data generation unit 44 outputs feature point information including the position of a feature point and feature amount information to the degree-of-reliability provision unit 45.

The degree-of-reliability provision unit 45 determines whether or not the own vehicle 1 is traveling in the vicinity of the target parking position 2. For example, the degree-of-reliability provision unit 45 may determine whether or not the own vehicle 1 is traveling in the vicinity of the target parking position 2, based on the current position of the own vehicle 1 calculated by the self-position calculation unit 41.

For example, when the own vehicle 1 is caused to leave the target parking position 2, the degree-of-reliability provision unit 45 may determine that the own vehicle 1 is traveling in the vicinity of the target parking position 2. For example, when distance between the current position of the own vehicle 1 and the target parking position 2 is less than or equal to a predetermined value and the own vehicle 1 is moving away from the target parking position 2 or a parking space-leaving assistance function is being performed, the degree-of-reliability provision unit 45 may determine that the own vehicle 1 is caused to leave the target parking position 2.

In addition, for example, when the parking assistance control to assist parking to the target parking position 2 is being performed, the degree-of-reliability provision unit 45 may determine that the own vehicle 1 is traveling in the vicinity of the target parking position 2. For example, when the distance between the current position of the own vehicle 1 and the target parking position 2 is less than or equal to a predetermined value and the operation mode of the parking assistance device 10 is the parking assistance mode, the degree-of-reliability provision unit 45 may determine that the parking assistance control to assist parking at the target parking position 2 is being performed.

The degree-of-reliability provision unit 45 uses the position of a feature point that is output from the learned target object data generation unit 44 when the own vehicle 1 is traveling in the vicinity of the target parking position 2, as a surrounding target object position.

The degree-of-reliability provision unit 45 counts, with respect to each learned target object position stored in the storage device 19, the number of times that the learned target object position coincides with a surrounding target object position and updates the degree of reliability of each learned target object position according to the number of times that the learned target object position coincides with a surrounding target object position every time the own vehicle 1 travels in the vicinity of the target parking position 2.

Specifically, the degree-of-reliability provision unit 45 provides a degree of reliability in such a way that the degree of reliability of a learned target object position having a large number of times of coincidence with a surrounding target object position is higher than the degree of reliability of a learned target object position having a small number of times of coincidence with a surrounding target object position. For example, the degree-of-reliability provision unit 45 may provide a degree of reliability in such a manner that the larger the number of times that a learned target object position coincides with a surrounding target object position is, the higher the degree of reliability of the learned target object position is. For example, the degree-of-reliability provision unit 45 may provide the number of times that a learned target object position coincides with a surrounding target object position as a degree of reliability of the learned target object position.

The relative position estimation unit 46 retrieves learned target object positions and degrees of reliability of the learned target object positions that are stored in the storage device 19 as the learned target object data 20. The relative position estimation unit 46 selects only a learned target object position having a degree of reliability greater than or equal to a predetermined threshold degree of reliability among the retrieved learned target object positions. The predetermined threshold degree of reliability may be, for example, a value obtained by subtracting a predetermined value from a highest degree of reliability among the degrees of reliability of the learned target object positions, may be a degree of reliability ranked at a predetermined place in the descending order from a maximum value among the degrees of reliability of the learned target object positions, or may be set based on an average of the degrees of reliability of the learned target object positions.

The relative position estimation unit 46, by matching the selected learned target object position with a target object position detected in the parking assistance mode, associates target object positions detected with respect to the same object with each other.

The relative position estimation unit 46 estimates, based on relative positional relationships between the target object positions detected in the parking assistance mode and the own vehicle 1 and relative positional relationships between learned target object positions associated with the detected target object positions and the target parking position 2, a relative position of the current position of the own vehicle 1 with respect to the target parking position 2.

For example, target object positions detected in the parking assistance mode are denoted by $(x_i, y_i)$, and target object positions of learned target objects each of which is associated with one of the target object positions $(x_i, y_i)$ are denoted by $(x_{mi}, y_{mi})$ ($i=1$ to N). For example, the relative position estimation unit 46 may calculate an affine transformation matrix $M_{affine}$, using the following equation, based on a least-square method.

$$\begin{bmatrix} a_1 \\ a_2 \\ a_3 \\ a_4 \end{bmatrix} = [X_X^T X_X]^{-1} X_X^T X_{tfm} \quad \text{[Math 1]}$$

where $$X_X = \begin{bmatrix} x_{m1} & y_{m1} & 1 & 0 \\ y_{m1} & -x_{m1} & 0 & 1 \\ \vdots & \vdots & \vdots & \vdots \\ x_{mN} & y_{mN} & 1 & 0 \\ y_{mN} & -x_{mN} & 0 & 1 \end{bmatrix}$$

$$X_{tfm} = \begin{bmatrix} x_1 \\ y_1 \\ \vdots \\ x_N \\ y_N \end{bmatrix}$$

$$M_{affine} = \begin{bmatrix} a_1 & a_2 & a_3 \\ -a_2 & a_1 & a_4 \end{bmatrix}$$

The relative position estimation unit 46 may calculate a column vector $(a_1, a_2, a_3, a_4)^T$ as in the following equation, using a least-square method.

$$W = \text{diag}(w_1 \ldots w_N) \quad \text{[Math 2]}$$

$$\begin{bmatrix} a_1 \\ a_2 \\ a_3 \\ a_4 \end{bmatrix} = [X_X^T W X_X]^{-1} X_X^T W X_{tfm}$$

The relative position estimation unit 46 converts a position (targetx$_m$, targety$_m$) of the target parking position 2 in the fixed coordinate system that is included in the learned target object data 20 to a position (targetx, targety) in the vehicle coordinate system, using the following equation.

$$\begin{Bmatrix} targetx \\ targety \end{Bmatrix} = M_{affine} \begin{Bmatrix} targetx_m \\ targety_m \\ 1 \end{Bmatrix} \quad \text{[Math 3]}$$

The target trajectory generation unit 47 generates a target travel trajectory starting from the current position of the own vehicle 1 in the vehicle coordinate system (that is, the coordinate origin) and reaching the position (targetx, targety) in the vehicle coordinate system of the target parking position 2.

Although a well-known method employed in an autonomous parking device that has already generally been known can be applied to calculation of a target travel trajectory starting from the current position of the own vehicle 1 and reaching the target parking position 2, a target travel trajectory can be calculated by, for example, connecting a clothoid curve from the current position of the own vehicle 1 to the target parking position 2, as an example. When the target travel trajectory includes a turning-back point, the target travel trajectory can be calculated by, for example, connecting clothoid curves from the current position of the own vehicle to the turning-back point, and from the turning-back point to the target parking position 2 in turn.

In addition, the target trajectory generation unit 47 calculates a target vehicle speed profile in which movement speed at each position on the target travel trajectory from the current position of the own vehicle to the target parking position 2 is set. For example, the target vehicle speed profile causes the own vehicle 1 to basically travel at a predetermined prescribed set speed, and a vehicle speed profile that causes the own vehicle 1 to accelerate to the set speed from the current position of the own vehicle 1 and subsequently come to a stop at the target parking position 2 can be calculated. When the target travel trajectory includes a turning-back point, the target trajectory generation unit 47 may calculate a vehicle speed profile that causes the own vehicle 1 to decelerate before the turning-back point and stop at the turning-back point, accelerate to the set speed from the turning-back point, and decelerate before the target parking position 2 and stop at the target parking position 2. The target trajectory generation unit 47 may set a set speed in the calculation of a speed profile, based on curvature of the calculated target travel trajectory in such a manner that the larger the curvature is, the lower the speed becomes.

The steering control unit 48 controls the steering actuator in the actuators 16 in such a way that the own vehicle 1 travels along the target travel trajectory.

In addition, the vehicle speed control unit 49 controls the accelerator actuator and the brake actuator in the actuators 16 in such a way that the vehicle speed of the own vehicle 1 changes in accordance with the movement speed plan that the target trajectory generation unit 47 calculated. Because of this configuration, the own vehicle 1 is controlled to travel along the target travel trajectory.

The assistance image generation unit 50 generates a parking assistance image that represents the target travel trajectory calculated by the target trajectory generation unit 47 and the current position of the own vehicle 1. For example, the parking assistance image may be an image obtained by superimposing the target travel trajectory and the current position of the own vehicle 1 on a bird's eye view or an aerial view in which the surroundings of the own vehicle 1 is viewed from above. The assistance image generation unit 50 displays the parking assistance image on the display device in the human-machine interfaces 15.

(Operation)

FIG. 6 is a flowchart of an example of processing in which a target object position is stored in the target object learning mode. In step S1, the feature point detection unit 43 detects a target object position around the target parking position 2 from a surrounding image acquired by capturing the surroundings of the own vehicle, while the own vehicle 1 is moved to be parked at the target parking position 2 by manual driving.

In step S2, the learned target object data generation unit 44 stores the target object position detected by the feature point detection unit 43 in the storage device 19 as a learned target object position. On this occasion, the learned target object data generation unit 44 stores a learned target object position and a degree of reliability in association with each other in the storage device 19 as the learned target object data 20. Subsequently, the process terminates.

FIG. 7 is a flowchart of an example of processing in which the degree of reliability of a target object position is updated on every occasion when the own vehicle 1 travels in a vicinity of the target parking position 2 after the learned target object position is stored. However, among occasions when the own vehicle 1 travels in the vicinity of the target parking position 2, an example of a case where the own vehicle 1 is parked at the target parking position 2 in the parking assistance mode will be illustrated in FIG. 8. For example, the processing in FIG. 7 is performed when the own vehicle 1 is caused to leave the target parking position 2.

In step S11, the feature point detection unit 43 detects a surrounding target object position that is a target object position around the own vehicle 1 from a surrounding image acquired by capturing the surroundings of the own vehicle 1.

In step S12, the degree-of-reliability provision unit 45 determines whether or not a learned target object position stored in the storage device 19 coincides with the target object position detected in step S11. The degree-of-reliability provision unit 45 increases, for a learned target object position that coincides with the target object position detected in step S11, a number obtained by counting the number of times that the learned target object position coincides with the surrounding target object position by one. For a learned target object position that does not coincide with the target object position detected in step S11, the degree-of-reliability provision unit 45 does not increase the number obtained by counting the number of times that the learned target object position coincides with the surrounding target object position. The degree-of-reliability provision unit 45 updates the degree of reliability of each learned target object position according to the number of times that the learned target object position coincides with a surrounding target object position. Subsequently, the process terminates.

FIG. 8 is a flowchart of an example of the parking assistance control of the embodiment. In step S21, the feature point detection unit 43 detects a surrounding target object position that is a target object position around the own vehicle 1 from a surrounding image acquired by capturing the surroundings of the own vehicle.

In step S22, the relative position estimation unit 46 estimates, based on only a learned target object position having a degree of reliability greater than or equal to a predetermined threshold degree of reliability among the learned target object positions stored in the storage device 19 as the learned target object data 20 and the surrounding target object position detected in step S21, a relative position of the current position of the own vehicle 1 with respect to the target parking position 2.

In step S23, the target trajectory generation unit 47 generates, based on the relative position of the own vehicle 1 with respect to the target parking position 2, a target travel trajectory that the own vehicle is caused to travel from the current position of the own vehicle 1 to the target parking position 2 and a target vehicle speed profile.

In step S24, the steering control unit 48 controls a steering angle in such a way that the own vehicle 1 travels along the target travel trajectory. The vehicle speed control unit 49 controls movement speed of the own vehicle 1 in accordance with the target vehicle speed profile. Through this processing, the steering control unit 48 and the vehicle speed control unit 49 cause the own vehicle 1 to move to the target parking position 2.

In step S25, the degree-of-reliability provision unit 45 determines whether or not a learned target object position stored in the storage device 19 coincides with the target object position detected in step S21. The degree-of-reliability provision unit 45 increases, for a learned target object position that coincides with the target object position detected in step S21, a number obtained by counting the number of times that the learned target object position coincides with the surrounding target object position by one. For a learned target object position that does not coincide with the target object position detected in step S21, the degree-of-reliability provision unit 45 does not increase the number obtained by counting the number of times that the learned target object position coincides with the surrounding target object position. The degree-of-reliability provision unit 45 updates the degree of reliability of each learned target object position according to the number of times that the learned target object position coincides with a surrounding target object position. Subsequently, the process terminates.

Advantageous Effects of Embodiment (1) The controller 17: stores positions of a plurality of target objects detected around the target parking position 2 when the own vehicle 1 is parked at the target parking position 2 as learned target object positions; when the own vehicle 1 travels in a vicinity of the target parking position 2 after the learned target object positions are stored, counts, with respect to each of the learned target object positions, the number of times that the learned target object position coincides with a surrounding target object position that is a position of a target object detected around the own vehicle 1; provides a higher degree of reliability to a learned target object position having a large number of times of coincidence with a surrounding target object position than to a learned target object position having a small number of times of coincidence with a surrounding target object position; by comparing a learned target object position having a degree of reliability greater than or equal to a predetermined threshold degree of reliability among the learned target object positions with a position of a target object detected around the own vehicle 1, calculates a relative position of the own vehicle 1 with respect to the target parking position 2; based on the calculated relative position, calculates a target travel trajectory from the current position of the own vehicle 1 to the target parking position 2; and performs parking assistance control to assist movement of the own vehicle 1 along the target travel trajectory.

Because of this configuration, when positions of a fixed object and a movable object are stored as learned target object positions, and when the movable object is subsequently moved before a time point at which the parking assistance control is performed, a higher degree of reliability can be provided to the learned target object position of the fixed object than to the learned target object position of the movable object. Since among the learned target object positions, only the learned target object position of the fixed object can be selected and used for the calculation of the relative position of the own vehicle 1 with respect to the target parking position 2, it is possible to prevent calculation precision of the relative position from deteriorating.

(2) Occasions when the own vehicle 1 travels in the vicinity of the target parking position 2 after the learned target object positions are stored may include an occasion when the own vehicle 1 first travels in the vicinity of the target parking position 2 after the learned target object positions are stored. Because of this configuration, when the movable object is moved during a period from when the learned target object positions are stored until subsequently the own vehicle 1 first travels in the vicinity of the target parking position 2, a target travel trajectory can be calculated excluding the learned target object position of the movable object from when the own vehicle 1 is first parked at the target parking position 2 after the learned target object positions are stored.

(3) In addition, the occasions when the own vehicle 1 travels in the vicinity of the target parking position 2 after the learned target object positions are stored may include a time when carrying out the parking assistance control to assist parking at the target parking position 2. Because of this configuration, the degrees of reliability of the learned target object positions can be updated every time the parking assistance control is performed.

(4) The occasions when the own vehicle 1 travels in the vicinity of the target parking position 2 after the learned target object positions are stored may include an occasion when the own vehicle 1 is caused to leave the target parking position 2. Because of this configuration, the degrees of reliability of the learned target object positions can be updated every time the own vehicle 1 is caused to leave the target parking position 2.

(5) The predetermined threshold degree of reliability may be a value obtained by subtracting a predetermined value from a highest degree of reliability among the degrees of reliability of a plurality of learned target object positions, may be a degree of reliability ranked at a predetermined place in the descending order from a maximum value among the degrees of reliability of the learned target object positions, or may be set based on an average of the degrees of reliability of the learned target object positions. Because of this configuration, the threshold degree of reliability can be appropriately set.

(6) The parking assistance control is, for example, control for the own vehicle 1 in which the own vehicle 1 is caused to move along the target travel trajectory from the current position of the own vehicle 1 to the target parking position 2. Because of this configuration, parking assistance to control the own vehicle in such a way that the own vehicle 1 travels to the target parking position 2 can be achieved.

(7) The parking assistance control may be control to display a target travel trajectory and the position of the own vehicle 1 on the display device that a user of the own vehicle can visually recognize. Because of this configuration, the passenger can visually recognize a target travel trajectory that the own vehicle 1 is caused to travel to the target parking position 2.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

40 Image conversion unit
41 Self-position calculation unit
43 Feature point detection unit
44 Learned target object data generation unit
45 Degree-of-reliability provision unit
46 Relative position estimation unit
47 Target trajectory generation unit
48 Steering control unit 49 Vehicle speed control unit
50 Assistance image generation unit

The invention claimed is:

1. A parking assistance method comprising:
   storing positions of a plurality of target objects detected around a target parking position when an own vehicle is parked at the target parking position as learned target object positions;
   when the own vehicle travels in a vicinity of the target parking position after the learned target object positions are stored, counting, with respect to each of the learned target object positions, a number of times that the learned target object position coincides with a surrounding target object position, the surrounding target object position being a position of a target object detected around the own vehicle;
   providing a higher degree of reliability to the learned target object position having a large number of times of coincidence with the surrounding target object position than to the learned target object position having a small number of times of coincidence with the surrounding target object position;
   by comparing the learned target object position having a degree of reliability greater than or equal to a predetermined threshold degree of reliability among the learned target object positions with a position of a target object detected around the own vehicle, calculating a relative position of an own vehicle with respect to the target parking position;
   based on the calculated relative position, calculating a target travel trajectory from a current position of the own vehicle to the target parking position; and
   performing parking assistance control to assist movement of the own vehicle along the calculated target travel trajectory.

2. The parking assistance method according to claim 1, wherein occasions when the own vehicle travels in a vicinity of the target parking position after the learned target object positions are stored include an occasion when the own vehicle first travels in a vicinity of the target parking position after the learned target object positions are stored.

3. The parking assistance method according to claim 1- or 2, wherein occasions when the own vehicle travels in a vicinity of the target parking position after the learned target object positions are stored include a time when carrying out the parking assistance control to assist parking at the target parking position.

4. The parking assistance method according to claim 1, wherein occasions when the own vehicle travels in a vicinity of the target parking position after the learned target object positions are stored include an occasion when the own vehicle is caused to leave the target parking position.

5. The parking assistance method according to claim 1, wherein the parking assistance method sets the predetermined threshold degree of reliability to a value obtained by subtracting a predetermined value from a highest degree of reliability among degrees of reliability of the learned target object positions.

6. The parking assistance method according to claim 1, wherein the parking assistance method sets the predetermined threshold degree of reliability, based on an average of degrees of reliability of the learned target object positions.

7. The parking assistance method according to claim 1, wherein the parking assistance method sets the predetermined threshold degree of reliability to a degree of reliability ranked at a predetermined place in descending order from a maximum value among degrees of reliability of the learned target object positions.

8. The parking assistance method according to claim 1, wherein the parking assistance control is control for the own vehicle in which the own vehicle is caused to move along the target travel trajectory from a current position of the own vehicle to the target parking position.

9. The parking assistance method according to claim 1, wherein the parking assistance control is control to display the target travel trajectory and a position of the own vehicle on a display device, the display device being visually recognizable by a user of the own vehicle.

10. A parking assistance device comprising:
    a sensor configured to detect a target object position, the target object position being a position of a target object around an own vehicle; and
    a controller configured to:
       store positions of a plurality of target objects detected around the target parking position when the own vehicle is parked at a target parking position as learned target object positions;
       when the own vehicle travels in a vicinity of the target parking position after the learned target object positions are stored, count, with respect to each of the plurality of learned target object positions, a number of times that the learned target object position coincides with a surrounding target object position, the surrounding target object position being a position of a target object detected around the own vehicle;
       provide a higher degree of reliability to the learned target object position having a large number of times of coincidence with the surrounding target object position than to the learned target object position having a small number of times of coincidence with the surrounding target object position;
       by comparing the learned target object position having a degree of reliability greater than or equal to a predetermined threshold degree of reliability among the learned target object positions with a target object position detected around the own vehicle, calculate a relative position of an own vehicle with respect to the target parking position; based on the calculated relative position, calculate a target travel trajectory from a current position of the own vehicle to the target parking position; and
    performs parking assistance control to assist movement of the own vehicle along the calculated target travel trajectory.

* * * * *